Patented Aug. 11, 1942

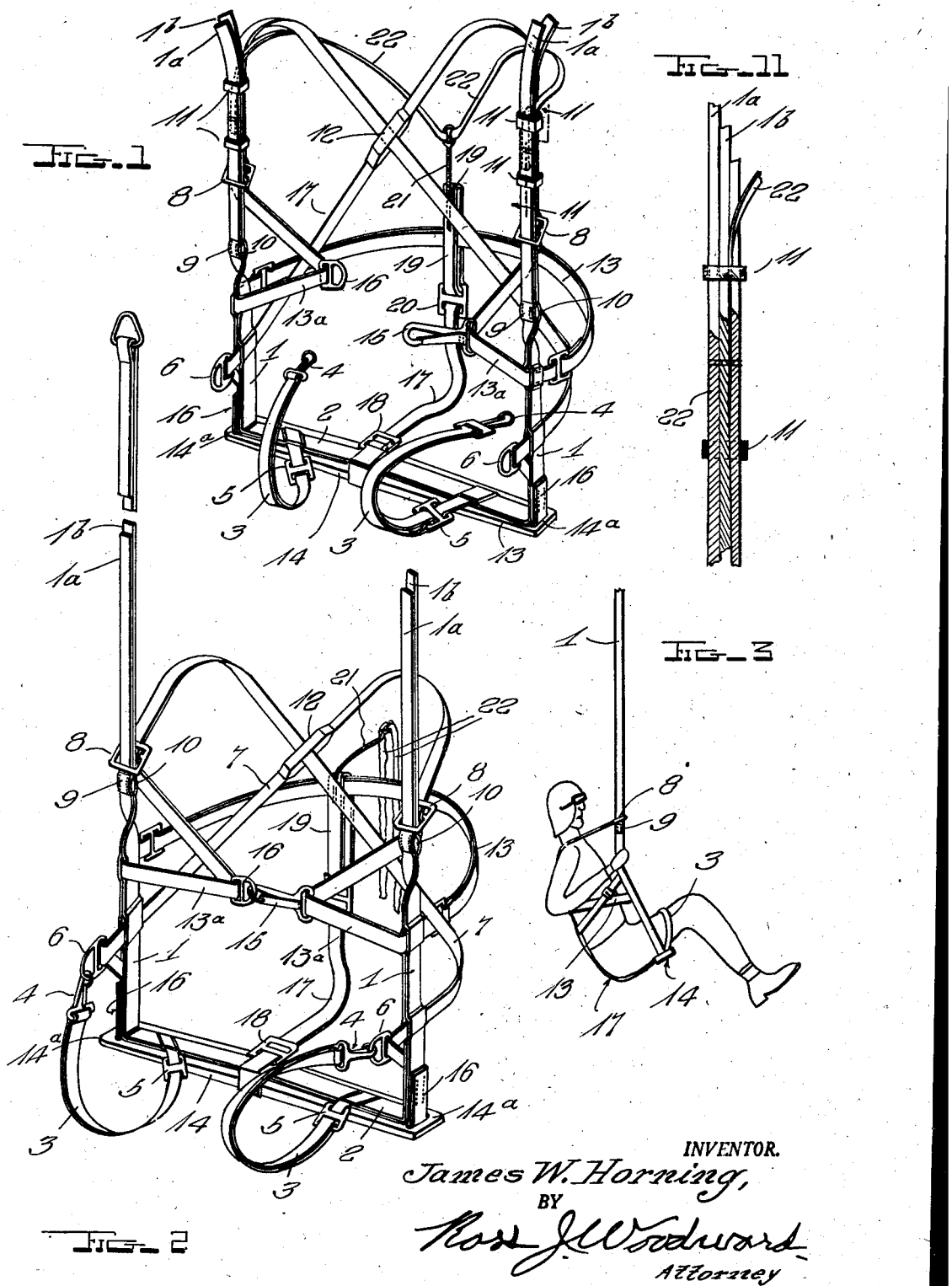

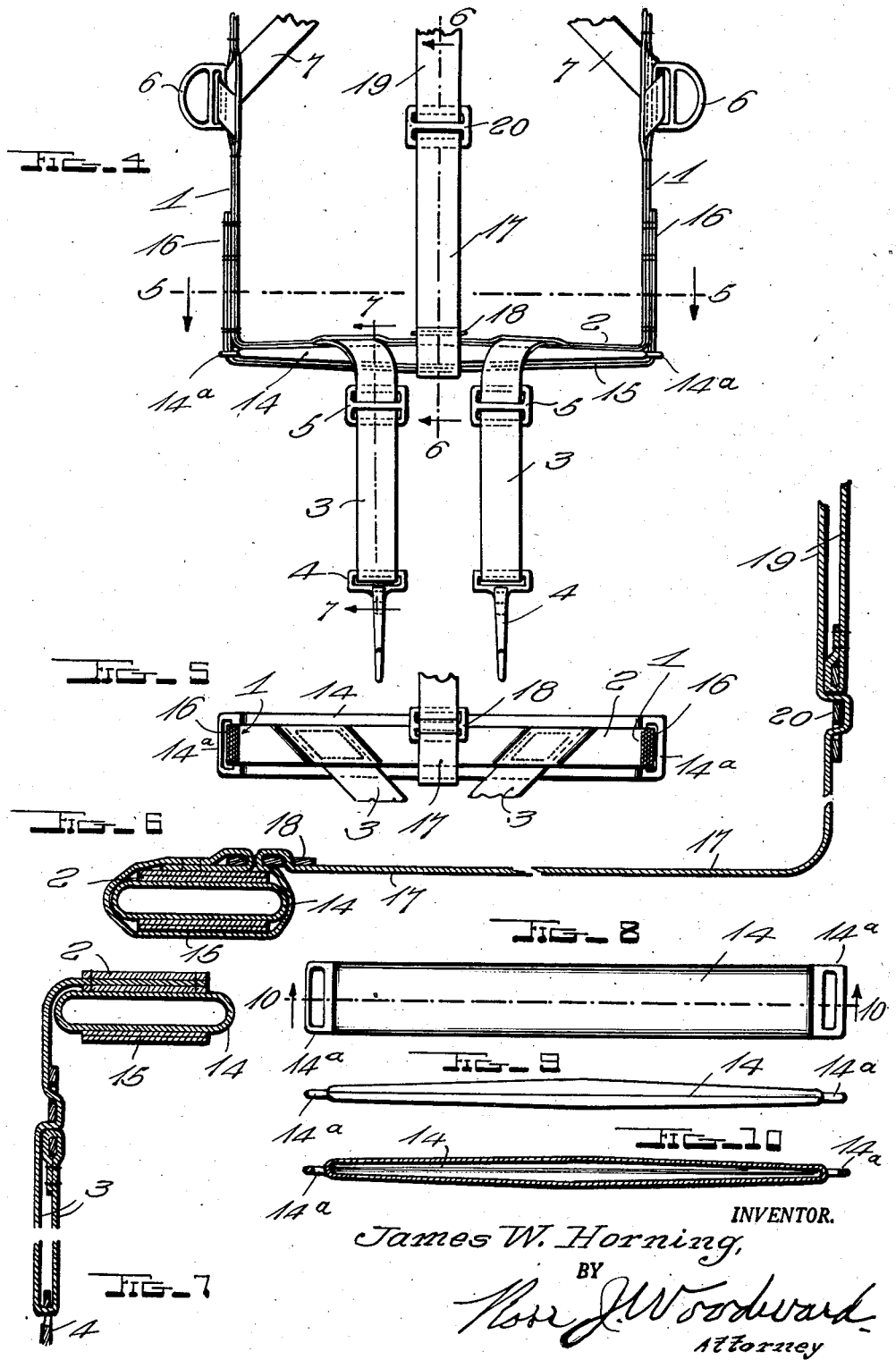

2,292,639

UNITED STATES PATENT OFFICE 2,292,639

PARACHUTE HARNESS

James W. Horning, Sayville, N. Y., assignor to Horning Parachute Harness Co., Inc.

Application June 3, 1940, Serial No. 338,660

6 Claims. (Cl. 244—151)

This invention relates to a parachute harness and more particularly to a harness of the type used with pack parachutes. At the present time an aviator has difficulty in releasing a parachute harness when landing. This is due to the fact that the aviator hangs in such a position that the securing straps are under tension and their hooks cannot easily be released. This is objectionable as when a landing is made on the ground, the aviator is liable to be dragged and injured if he cannot quickly release himself from the harness and if a landing is made on water and he cannot quickly release himself from the harness, he is liable to drown by being dragged face downward through the water or by the weight of the parachute causing him to sink before a rescue boat reaches him.

Therefore, one object of the invention is to provide a harness having the parachute engaging straps so mounted that when they are subjected to a jerk as the parachute opens they will cause the aviator to be suspended in substantially a seated position, thus removing strain from the leg straps and the waist strap and permitting buckles carried by these straps to be very easily released before a landing is made.

Another object of the invention is to so apply the parachute engaging straps that the aviator will be supported at such an angle after the parachute opens that he will not be liable to fall out of the harness even if the hooks of the safety straps are released at quite a distance above the ground.

Another object of the invention is to provide the harness with a cross bar of metal or other stiff material which extends back of the legs transversely thereof and constitutes a stiff seat upon which the aviator rests while descending.

Another object of the invention is to provide a harness of such construction that a conventional harness may be easily transformed into a harness of the improved construction.

The invention is illustrated in the accompanying drawings, wherein:

Fig. 1 is a perspective view of the improved harness as it appears when initially put on by an aviator.

Fig. 2 is a perspective view showing the parachute engaging straps ripped loose by the jerk of an opening parachute to allow the harness to assume a tilted position and support the aviator in a seated position while descending.

Fig. 3 is a side elevation showing the harness in tilted position.

Fig. 4 is a front elevation of the harness.

Fig. 5 is a view taken on the line 5—5 of Fig. 4.

Fig. 6 is a fragmentary sectional view on the line 6—6 of Fig. 4.

Fig. 7 is a fragmentary sectional view on the line 7—7 of Fig. 4.

Fig. 8 is a top plan view of the seat bar.

Fig. 9 is a view looking at the front of the seat bar.

Fig. 10 is a sectional view taken longitudinally through the seat bar on the line 10—10 of Fig. 8.

Fig. 11 is a fragmentary sectional view on the line 11—11 of Fig. 1.

The harness constituting the subject matter of this invention has the usual side straps 1 which are doubled to form plies 1a and 1b and have their lower ends connected by a cross portion 2 carrying leg straps 3 equipped with snap hooks 4 at their free ends. The leg straps are adjustable longitudinally and provided with conventional buckles 5 in order that they may be held at adjusted lengths. The hooks 4 are detachably engaged with eyes 6 when the harness is worn, in order to hold the straps 3 about a person's legs, the eyes 6 being carried by lower ends of straps 7 which may be termed shoulder straps as they extend upwardly in crossed relation to each other at the back of the harness for engaging over a person's shoulders and then extending downwardly at the front and carry buckles 8 slidably mounted on the side straps 1. Stops 9 formed by pads 10 sewed or otherwise secured between the plies or sections of the side straps, limit upward sliding of the side straps through the buckles 9 from their initial positions shown in Fig. 1 to the positions shown in Figs. 2 and 3. From an inspection of Fig. 1, it will be seen that the side straps and the depending forward portions of the shoulder straps are initially held in flat face to face contact with each other by fragile fasteners 11 which are formed of tire tape or other suitable material capable of being torn loose by strain exerted when an opened parachute exerts pull on the side straps. When this pull occurs, the harness tilts rearwardly and the side straps slide through the buckles until the stops 9 engage the buckles and prevent rearward tilting of the harness beyond the position shown in Fig. 3. Therefore, an aviator will be prevented from tilting rearwardly to a position in which he might be liable to fall out of the harness and will be supported in a seated position in the harness. A retainer band or strip 12 holds the shoulder straps in proper cross relation to each other at the back of the aviator. The usual back strap 13 is provided to extend across the small of the aviator's back and has its end portions slidably mounted through the side straps and integrally connected with the shoulder straps by portions 13 constituting chest straps and carrying a snap hook 15 and an eye 16 which are to be engaged with each other as shown in Fig. 2 and hold the chest straps in position to prevent an aviator from falling forwardly out of the harness when making a jump.

In order to brace the cross portion 2 of the harness and provide a solid seat for the harness, there has been provided a cross bar or seat 14 which is preferably formed of metal tubing but may be formed of wood or other suitable material. This bar has flat upper and lower faces and curved front and rear edges and is gradually reduced in thickness toward its ends where it terminates in eyes 14a. A fabric securing strip 15 extends along the under face of the seat bar with its end portions 16 extending upwardly and sewed or otherwise firmly secured against the outer faces of the side straps 1. A strap 17 has one end portion wrapped about the seat bar and the fabric strips which extend along upper and lower faces of the bar and firmly secured by a buckle 18. This strap 17 extends rearwardly from the seat bar and then upwardly and is formed with a loop 19 loosely engaged about the back strap 13. Since the folded end portion of the strap which forms the loop carries a buckle 20, it may be adjusted longitudinally and the strap caused to fit properly. An auxiliary strip or narrow strap 21 is secured at one end to the loop 19 adjacent the upper end thereof and at its other end carries elastic shoulder bands 22 which extend upwardly and forwardly over the shoulders and are secured by stitching between forward portions of the shoulder straps 7 and the side straps 1. The elastic strips exert upward pull on the strap 17 and hold it close against the aviator wearing the harness. It should also be noted that the elasticity of the strips permits sufficient give to prevent binding when an aviator wearing the harness leans over and there will be no danger of the strips accidentally tearing loose.

During use of the harness it is put on in the usual manner with the leg straps brought forwardly and upwardly between the legs and the hooks 4 are engaged with the eyes 6. The extensions 13a of the back straps 13 are then brought forward toward each other and the buckles 15 engaged with the eye 16. Upper portions of the side straps will now extend rearwardly over the shoulders and down to the parachute pack and, since the side straps and the forward portions of the shoulder straps are secured to each other by the tapes 11, they cannot move out of their proper positions and become tangled when a jump is made and the rip-cord pulled to release the parachute. The seat bar fits close against the upper portions of the aviator's legs across the rear thereof where it is held by the leg straps. When a jump is made and the parachute is released, the sudden jerk caused when the parachute opens tears the tapes 11 and the buckles 8 will slide along the side straps until they engage the stops 9. The harness will then assume a rearward tilt, as shown in Fig. 3, and the aviator will be supported in a seated position. The stitches holding the elastic strips will also be torn loose and these strips, together with strip 20 will hang downwardly at the back of the harness. The rigid seat bar not only provides a comfortable seat for the aviator but also acts as a rigid foundation or base for the harness and the leg straps and the extensions 14 will be sufficiently loose to permit the hooks to be easily released even before reaching the ground and the aviator may quickly throw off the harness upon landing and will not be dragged. The fact that the harness is supported in rearwardly tilted position eliminates any danger of the aviator falling out of the harness and being killed or injured. Instead of using tire tape to temporarily bind the forward portions of the shoulder straps to the side straps, snap fasteners or the like may be substituted and the upper forward ends of the elastic strips 22 may be detachably secured by means other than thread.

Having thus described the invention, what is claimed is:

1. In a parachute harness, suspension straps at sides of the harness having portions extending between their lower ends to form a cross strap, a seat bar consisting of a flattened tubular metal bar extending along the under face of the cross strap with its end portions projecting outwardly from the suspension straps and provided with eyes, and a supporting strap extending along the under face of the seat bar with its end portions extending upwardly through the eyes and firmly secured to the suspension straps above the seat bar and the cross strap.

2. In a parachute harness, suspension straps at sides of the harness having portions extending between their lower ends to form a cross strap, a seat bar consisting of a flattened tubular metal bar having its ends formed with eyes, the seat bar extending along the cross strap under the same with its eyes projecting outwardly from the suspension straps, a supporting strap extending along the under face of the seat bar with its end portions extending upwardly through the eyes and firmly secured against outer side faces of the suspending straps, a back strap carried by the suspension straps, and a strap having one end secured about the seat bar and the cross strap and the supporting strap midway the length of the seat bar, the last mentioned strap extending rearwardly from the seat bar and upwardly with its upper portion secured to the back strap.

3. In a parachute harness, suspension straps at sides of the harness having portions extending between their lower ends to form a cross strap, a seat bar consisting of a flattened tubular metal bar having its ends formed with eyes, the seat bar extending along the cross strap under the same with its eyes projecting outwardly from the suspension straps, a supporting strap extending along the under face of the seat bar with its end portions extending upwardly through the eyes and firmly secured against outer side faces of the suspending straps, a back strap carried by the suspension straps, and a strap having one end secured about the seat bar and the cross strap and the supporting strap midway the length of the seat bar, the last mentioned strap extending rearwardly from the seat bar and upwardly with its upper portion formed into a loop loosely engaged about the back strap, shoulder straps secured at their lower ends to the suspension straps and having their upper ends brought forwardly and slidably connected with the suspension straps for movement to a position allowing limited rearward tilting of the harness, means for temporarily holding the shoulder straps against sliding movement along the suspension straps adapted to be released by jerk of an opening parachute, a strip secured at its lower end to the loop engaged about the back strip, and elastic strips extending from the upper end of the last mentioned strip and temporarily secured between the shoulder straps and the suspension straps.

4. In a parachute harness, suspension straps at sides of the harness, a stiff seat member mounted between lower ends of the suspension straps, a back strap carried by said suspension straps, shoulder straps secured at their lower ends to the suspension straps and extending upwardly with their upper end portions brought forward, eyes at front ends of the shoulder straps loosely engaged about the suspension straps to permit sliding movement of the shoulder straps and the suspension straps relative to each other, means to temporarily hold the shoulder straps in fixed positions relative to the suspension straps, and abutments carried by the suspension straps above the back strap for engaging said eyes to limit sliding of the suspension straps through the eyes and cause the harness to tilt rearwardly and support a person wearing the harness in a seated position.

5. In a parachute harness, suspension straps at sides of the harness, a cross strap extending between lower ends of the suspension straps, a seat consisting of a flat stiff bar of greater length than the cross strap extending along the under face of the cross strap and having its ends projecting from the cross strap and formed with eyes, a supporting strap extending along the under face of the stiff bar with its end portions extending upwardly through the eyes and firmly secured to the suspension straps, a back strap carried by the suspension straps, and a strap having one end secured about the seat bar and the cross strap and the supporting strap and extending rearwardly therefrom and upwardly and connected with the back strap.

6. In a parachute harness, suspension straps at sides of the harness, a stiff seat mounted between lower ends of the suspension straps, a back strap carried by the suspension straps and spaced upwardly from the seat, a strap having one end secured to the seat midway the length thereof, the last mentioned strap extending rearwardly from the seat and upwardly and provided with a loop engaged about the back strap, shoulder straps having their lower ends secured to the suspension straps and their upper portions slidably connected with the suspension straps for movement to a position permitting limited rearward tilting of the harness, means for temporarily holding the shoulder straps against sliding movement along the suspension straps adapted to be released by the jerk of an opening parachute, a strip secured at its lower end to said loop, and elastic means extending from the upper end of the last mentioned strip and temporarily secured between the shoulder straps and the suspension straps.

JAMES W. HORNING.